July 7, 1936.     G. WASCHECK     2,046,436
GROUND IMPEDANCE MEASUREMENT
Filed June 12, 1935    3 Sheets-Sheet 1

INVENTOR
G. WASCHECK
BY
ATTORNEY

July 7, 1936.　　　　G. WASCHECK　　　　2,046,436

GROUND IMPEDANCE MEASUREMENT

Filed June 12, 1935　　　3 Sheets-Sheet 3

INVENTOR
G. WASCHECK
BY
ATTORNEY

Patented July 7, 1936

2,046,436

UNITED STATES PATENT OFFICE 2,046,436

GROUND IMPEDANCE MEASUREMENT

George Wascheck, Chappaqua, N. Y., assignor to American Telephone and Telegraph Company, a corporation of New York Application June 12, 1935, Serial No. 26,301

10 Claims. (Cl. 175—182)

This invention relates to the measurement of the mutual impedance of earth-return circuits and more particularly to methods of, and apparatus for measuring earth-resistivity.

The electromagnetic coupling between adjacent power and communication lines is one of the basic factors to be considered in the coordination of these two classes of service, for it determines how great a voltage may be induced in one line by a given current in the other. Direct measurement of the coupling usually involves considerable time and expense and is not feasible in all cases. The coupling may be calculated with some degree of precision, however, if the electrical resistivity of the earth in the vicinity of the inductive exposure is known. The present invention is designed to permit an accurate survey of earth-resistivity conditions to be made.

The invention has application also to the determination of the contour of substrata of the earth and particularly to the location of oil and mineral deposits by what is commonly known as the earth-resistivity method.

In accordance with one method known heretofore for measuring earth-resistivity, direct current is passed through the earth between two ground electrodes spaced apart a considerable distance, and an indication is obtained of the potential drop existing between two intermediate ground electrodes. From the ratio of potential drop across the "secondary circuit" to the current in the "primary circuit" the resistance of the earth between the intermediate electrodes can be calculated, or by suitable electrical means obtained directly, and from the measured resistance and the spacing of the electrodes the average resistivity of the earth can be computed.

Several modifications of the basic measuring scheme are practically essential. Variably stray earth currents and ground electrode polarization tend to mask the voltage drop to be measured. It is usual therefore to reverse the primary circuit current at a low frequency, of three to ten cycles per second, for example, and synchronously to reverse the connection of the voltage measuring device in the secondary circuit so as to rectify the reversed current and permit a direct current measurement to be made. In this manner, the polarization and stray earth potentials are periodically reversed as they are applied to the voltage measuring device and so they have little effect at least where the exploring circuits are of moderate length. Another factor is the electrode-to-ground resistance of the secondary circuit. This resistance may be measured independently and deducted from the total measured resistance or it may be eliminated from consideration by employing a null balance or potentiometric method of measuring the secondary circuit voltage drop, i. e. a method in which no current is permitted to flow in the secondary circuit. Further account must be taken of the fact that the primary circuit and secondary circuit current reversing devices may not have the same ratio of conducting surface to insulation surface and these "commutator factors" must be introduced into the computations.

An object of the present invention is to provide an earth-resistivity measuring system in which stray earth and polarization potentials are completely and automatically neutralized at all times.

Another object of the invention is to obviate the introduction of the commutator factors into the mathematical computations.

A subsidiary object of the invention is to reduce commutator sparking and the effect on the measurements of this and other transient disturbances.

Another object of the invention is to provide an alternating current system for measuring earth-resistivity, and means for determining the phase angle between primary circuit current and secondary circuit voltage.

A feature of the present invention is a device which introduces in the secondary circuit a voltage that is periodically and automatically adjusted to effect complete neutralization of stray earth potentials and other voltage disturbances. In one specific embodiment, the adjustment of the neutralizing voltage is effected by applying the disturbing voltage to a control device at periodic intervals between pulses of the primary circuit current.

Other objects and features, of which the foregoing are only typical, will appear from a consideration of the specific illustrative circuits and apparatus that are now to be described. Reference will be made to the accompanying drawings, in which.

Figure 1:
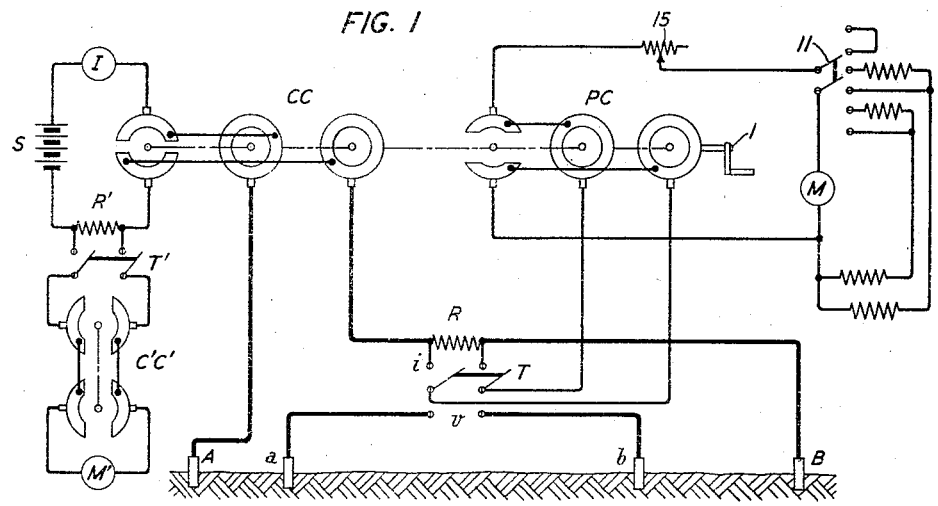
Figure 1 shows an earth-resistivity measuring circuit of the indicating-meter type.

Referring now to Fig. 1, there is shown a circuit for the determination of earth-resistivity or, more directly, the mutual resistance of two earth-return circuits. Reduced to its simplest form, the circuit operation is as follows: Current from a battery S or other suitable source is passed through a primary circuit to the ground electrodes A and B which may be spaced apart several hundred feet or more. Current traversing the earth-return path of the primary circuit causes a difference of potential to be established between various other points on the surface of the earth in the vicinity. The difference of potential thus established between any two such points is measured by connecting ground electrodes $a$ and $b$ to a secondary circuit comprising a voltage measuring device. Knowing the primary circuit current, as measured by ammeter I or other suitable instrument, and the secondary circuit potential drop, the mutual resistance of the two circuits may readily be calculated. Since it is only the ratio of potential difference to current that is of interest and not the absolute magnitude of these quantities, various modifications of the basic circuit are possible, and means may be provided for measuring this ratio directly.

Stray earth potentials and polarization effects at electrodes $a$ and $b$ are often found to be of such magnitude that it is difficult to distinguish the change in voltage in the secondary circuit that arises from the primary circuit current. The first-mentioned source of disturbances is variable with respect to time and both are usually unidirectional.

In the circuit shown in Fig. 1, the effect of stray earth potentials and electrode polarization is largely reduced by providing means for periodically reversing the primary circuit current and synchronously reversing the connection of the measuring instrument in the secondary circuit. This means is shown as a current reversing commutator CC comprising slip rings and a split commutator connected in series in the primary circuit, and a similar potential reversing commutator PC connected in series in the secondary circuit and mechanically coupled to the primary circuit commutator. With double-throw double-pole switch T in its lower or $v$ position, the potential drop across the secondary circuit is applied through the potential reversing commutator PC to the meter circuit.

Primary circuit current is determined preferably in the manner illustrated, viz. by measuring the periodically reversed voltage drop across a resistance R connected in series in that circuit. With switch T in its upper or $i$ position the voltage across resistance R is rectified in the same potential commutator PC and applied to the meter circuit. The meter circuit comprises adjustable series resistance 15, switch 11 and the constant input resistance multiplier associated therewith, and microammeter M.

To avoid the transient effect incident to the opening and closing of the primary circuit by the commutator CC, the segments of the potential reversing commutator PC are made of such length that the secondary circuit is closed for a shorter time when the primary circuit; and their relative positions are such that the secondary circuit is not closed until a short time after the primary circuit has been completed and it is opened shortly before the primary circuit is opened. Thus it is possible to make the measurement of both current and voltage while these quantities are constant in amplitude.

Where the secondary circuit electrode-to-ground resistance is not appreciable, the mutual ground impedance of the primary and secondary circuits may be measured as follows: With switch T thrown to its $i$ position so as to measure the potential drop across resistance R, a reading is taken on meter M with suitable values for series resistance 15 and the multiplier setting. Resistance 15 may be varied, for example, from zero to 10,000 ohms or more; the multiplier may be adapted to provide ratios of 1, 10, and 100. The meter deflection, series resistance and multiplier readings are recorded. Switch T is then thrown to its alternative position to measure secondary circuit voltage. Leaving resistance 15 unchanged, the microammeter reading is again observed, the multiplier being adjusted to give a suitable meter deflection. The mutual resistance of the two circuits is then equal to the resistance of R times the ratio of the meter deflection for the secondary circuit voltage indication to the meter deflection for the primary circuit current indication. If resistance R is exactly 1 ohm, the resistance factor becomes unity and the mutual resistance is numerically the ratio of the two meter readings.

If simultaneous indications of current and voltage are desired, switch T' may be closed, thus transferring the voltage drop across battery circuit series resistor R' through a current contactor C'C' to indicating instrument M'. The contactor C'C' is so designed that it permits current to pass only during the interval that commutator PC completes the circuit to meter M, and, therefore, only while the primary circuit current is constant. Under these conditions the current carrying coils of M and M' may be incorporated in one instrument to read the desired ratio directly.

In case the secondary circuit electrode-to-ground resistance is appreciable, the method of voltage measurement may be modified as follows: Two voltage readings are taken. In the first, resistance 15 is varied to produce the same meter deflection in the secondary circuit voltage measurement as was obtained in the primary circuit current measurement. A second reading of voltage is then obtained with resistance 15 adjusted to produce one-half the previous meter deflection. Then, if $R_0$ is the value of the series resistance, including that of the meter, for the first current reading, $R_1$ the series resistance for the same deflection for the voltage reading, $R_2$ the series resistance for one-half the meter deflection, $m_0$, $m_1$, and $m_2$ the corresponding multiplier settings, and R the calibrated resistance used as a current shunt in the primary circuit, the mutual resistance is equal to $$\left(\frac{m_2 R_2 - m_1 R_1}{m_0 R_0}\right) R$$

Since the commutator PC is employed in both the voltage and the current measurement and the average value of the rectified voltage applied to the meter is in each case reduced by the same fraction, i. e., the commutator factor, the ratio of the two indications of the meter is a true measure of the mutual resistance, and the absolute value of the commutator factor need not be determined.

Figure 2:
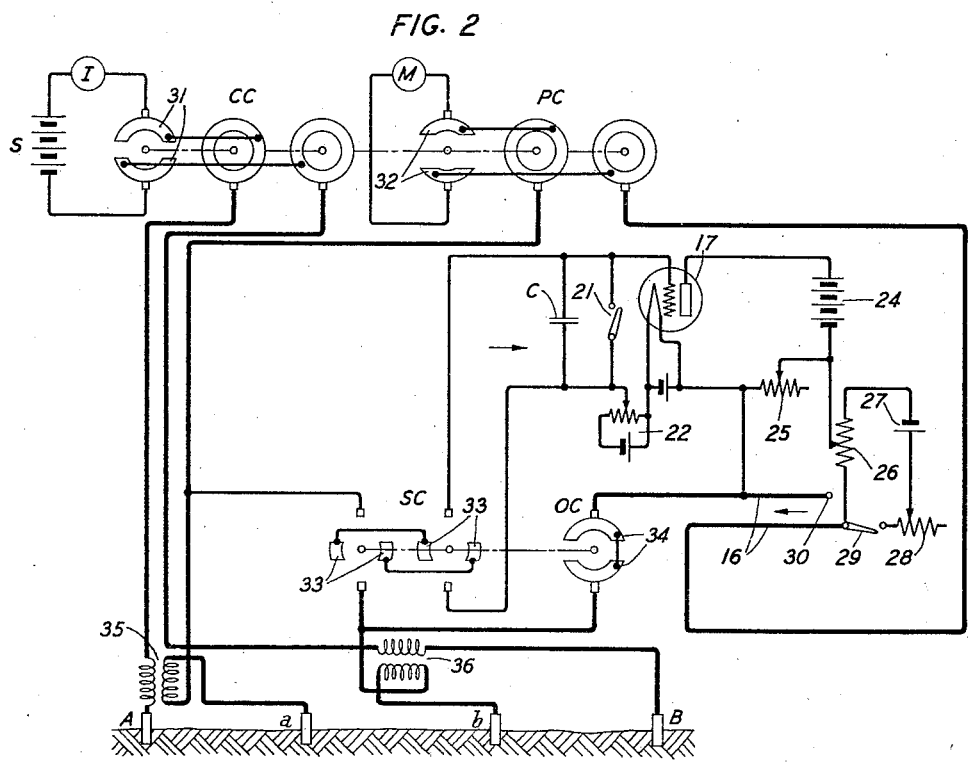
Fig. 2 shows schematically a measuring system embodying an automatically adjusted stray voltage neutralizing circuit.

Fig. 2 shows a circuit for measuring earth-resistivity that is featured by the means provided for neutralizing varying extraneous voltages appearing in the secondary circuit. Primary circuit current and secondary circuit induced voltage may be measured by ammeter I connected in series with battery S and by meter M connected to the potential commutator PC, although it is to be understood that this showing is intended to represent any suitable devices for measuring these two quantities.

The effect of stray potentials is reduced to a great extent as stated hereinbefore by virtue of the voltage reversal in the secondary circuit potential commutator. Although the earth potential is thus reversed as it is applied to the measuring instrument, nevertheless its magnitude may be so great relative to the potential drop caused by primary circuit current that the needle of the instrument vibrates and makes accurate readings difficult if not impossible. This is particularly true when the distance between the ground electrodes is of the order of several thousand feet.

The device provided in accordance with the present invention for neutralizing stray earth potentials and electrode polarization comprises, in the specific embodiment shown, a linear vacuum tube amplifier 17 to the grid circuit of which the stray secondary circuit potential is applied as a biasing voltage at an instant when no primary circuit current is flowing. The grid bias is held for the duration of a current pulse and during that interval determines the magnitude of a voltage in the output circuit of the amplifier that is introduced in series in the secondary circuit during the period when primary current is flowing and the secondary circuit voltage measurement is being made. The amplification of the circuit is such that the voltage introduced into the secondary circuit is exactly equal and opposite to the voltage applied to the input during the brief sampling period.

This device also tends to correct for transient voltages remaining in the secondary circuit in the interval of measurement and set up by the primary current transients and the mutual reactance between primary and secondary circuits, as will be explained hereinafter.

As shown in Fig. 2, a sampling contactor SC is arranged to connect the secondary circuit electrodes $a$, $b$ periodically to the input terminals of the space discharge amplifier. Segments 33 of contactor SC are so proportioned with respect to the insulation space between segments 31 of current commutator CC that the connections to the input circuit of the amplifier are made only during the brief period when the primary circuit is open. Condenser C connected across the input terminals of the amplifier is of such magnitude as to hold the voltage thus impressed on the grid of amplifier tube 17 constant for the following half-cycle of current flow. The capacity of condenser C must not be too large as it would tend to prolong the time of charging and it must not be so small as to lose its charge too rapidly when bridged across the tube alone. A switch 21 bridged across the condenser C is adapted to short-circuit the input of the stray voltage neutralizer circuit in order to make initial plate circuit adjustments. During use this is left open. A battery and voltage divider 22 are provided to adjust the normal grid bias applied to the amplifier.

The output circuit of the amplifier comprises plate current battery 24 and adjustable series resistor 25. Resistor 25 is connected in series in the secondary circuit through leads 16 and rotary contactor OC. One of the leads 16 includes a potential divider 26 which is connected to a local battery 27, variable series resistor 28 and switch 29. The potential divider 26 is adjusted so as to neutralize the normal voltage drop in resistor 25 (switch 21 closed). The segments 34 of contactor OC are so proportioned and positioned with respect to the other commutator segments of the system that the output circuit of the stray voltage neutralizer is connected into the secondary circuit only after the primary circuit has been completed and shortly before or simultaneous with the completion of the secondary voltage measuring circuit.

The adjustment of the neutralizer circuit may be made as follows: With switch 21 closed to short-circuit condenser C and thus to apply normal grid bias to the amplifier tube 17, switch 29 thrown to close the local battery circuit and with the commutators stationary in such position as to form a through circuit to the voltage measuring means M, the slider on potential divider 26 is adjusted to annul exactly the voltage drop in the plate resistance 25 as determined by means of the galvanometer or other indicator in the measuring circuit M. Switch 21 is then opened and the neutralizer is ready to function.

One possible cause of serious error in the measurement of earth resistivity the applicant has traced to inductive coupling between the primary and secondary circuits, this coupling being due to the fact that the two circuits may lie in close proximity to each other over considerable distances. The sudden interruption and reversal of the primary circuit current often causes a large transient electromotive force to be induced in the secondary circuit through the distributed mutual inductance of the two circuits. The induced voltage does not disappear instantly but may persist so long and decay so gradually that when the secondary circuit is connected to the measuring means it may still be so large as to cause a false measurement of the voltage transferred to the secondary circuit through the mutual earth resistance.

To minimize error from this source, it is proposed, in accordance with a feature of this invention, to introduce into the secondary circuit a voltage similar to and opposing the induced transient voltage still remaining during the interval of measurement. The neutralizing means may take the form of a lumped mutual inductance device or devices 35, 36 as shown in Fig. 2. The neutralizing devices 35 and 36 should be adjustable so that the voltage induced into the secondary circuit through them may be varied according to the closeness of coupling between the two exploring circuits.

Figure 3:
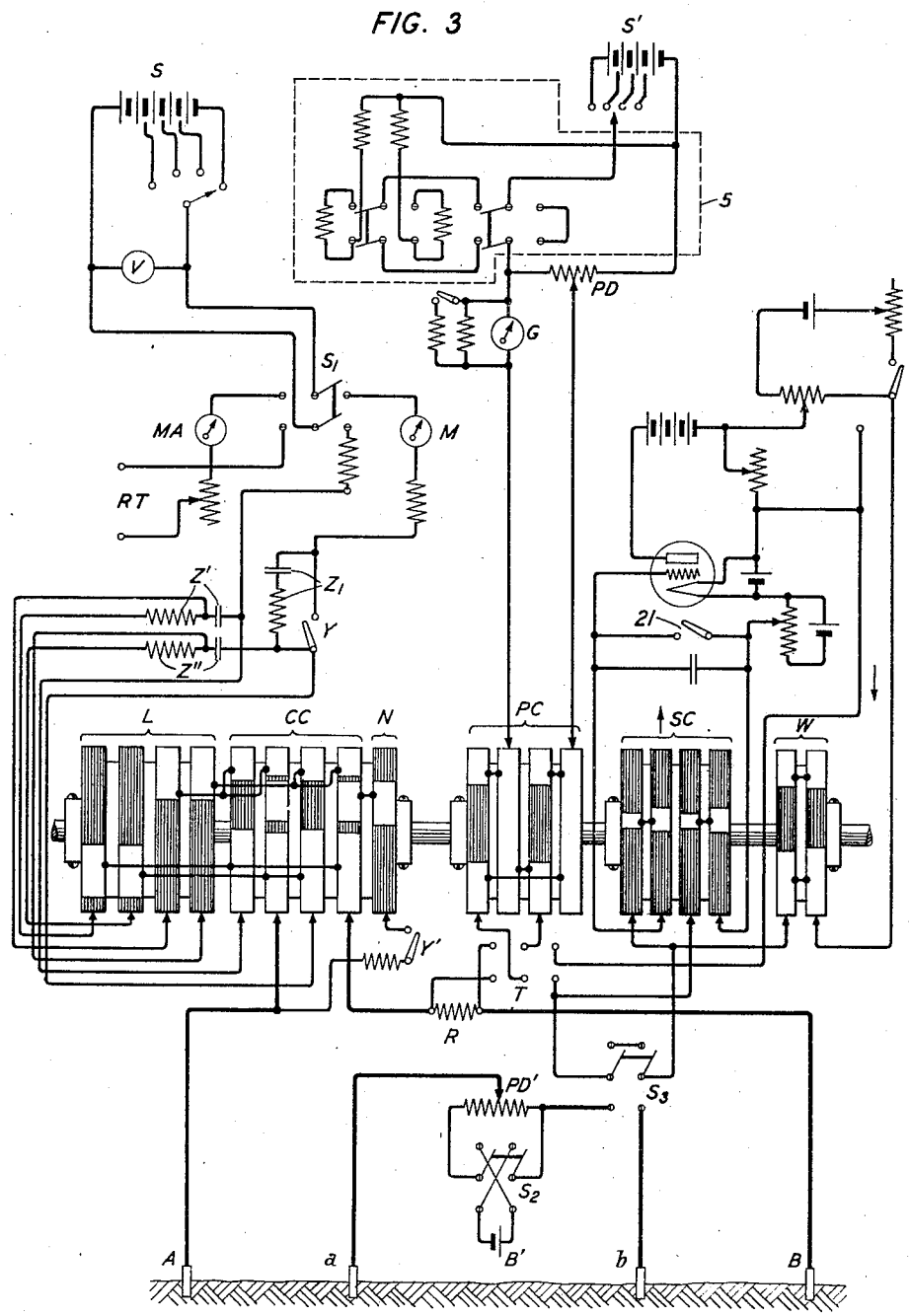
Fig. 3 shows schematically a complete measuring instrument adapted for field use, and in detail the construction of the commutators.

Fig. 3 shows a measuring circuit that incorporates several of the features of the present invention. The principal elements of the instrument are a primary circuit current source S, current reversing commutator CC and series resistance R, all comprising the primary circuit; and a secondary circuit comprising potential reversing commutator PC, standard battery S', potential divider PD and galvanometer G. Double-pole double-throw switch T is arranged to connect the potentiometer circuit either across resistance R or across the secondary circuit. Two means for neutralizing stray voltages are provided, each supplementing the other. One comprises a source B' connected through reversing switch $S_2$ to a potential divider PD' inserted in series in the secondary circuit. The other means comprises the vacuum tube circuit hereinbefore described with reference to Fig. 2.

Examining the primary circuit now in detail, the current source S is tapped to provide voltages which may range up to 180 volts. With double-pole double-throw switch S₁, thrown to the right-hand position, source S is connected through ammeter M and a pair of current limiting resistors through an on-off contactor Y, which is closed only when the commutator rotates, to a pair of brushes on the reversing commutator CC. The periodically reversed primary circuit current is then led from the other pair of brushes on commutator CC through series resistance R to the ground electrodes A, B. With switch S₁ thrown to its left-hand position, ground electrode resistances may be measured by means of connections to terminals RT and observation of the readings of voltmeter V, milliammeter MA, and the setting of the adjustable series resistance.

A resistance and condenser Z₁ are shunted across contactor Y to prevent arcing. Each of the brushes on the battery side of commutator CC is connected through condenser and resistance units, Z' and Z'', respectively, to brushes bearing on auxiliary segments on commutator L. The latter are connected to the respective current commutator segments under the battery brushes and are so set as to place the condensers alone across each battery brush and the underlying segments at the time of circuit breaking. During the next measuring cycle, preferably before the next potential commutator closure, the condensers are discharged through the resistances of the condenser-resistance units.

Sudden interruption of the primary circuit current as stated hereinbefore, tends to induce a large transient voltage in the secondary circuit when the exploring circuits are long and there is appreciable mutual inductance between them. The stray voltage neutralizer under certain conditions will approximately compensate for the transient voltage in the secondary circuit arising upon closure of the primary circuit and persisting during the early portion of the measuring interval, if the secondary circuit transient voltage arising when the primary circuit is opened and existing when the stray sampling circuit is connected is of comparable magnitude. This condition is brought about by preventing an abrupt break of the primary circuit in the following manner.

Each of the two sections of current commutator CC which revolve under the brushes that lead to the primary circuit has conducting segments inserted in the space between the positive and negative segments, though insulated from them. The two segments on one commutator section are individually connected to similarly placed segments on commutator N, the brush of the latter being connected through a resistance and switch Y' to the brush which is set over the other current commutator section and its intervening conducting segments. The segments are so placed that the primary circuit brushes come in contact with the intervening conducting segments slightly before the battery circuit is opened, which places the shunting resistance across the battery and the primary circuit line. The battery brushes immediately thereafter disconnect the battery from the shunted primary line, the latter, however, remaining shunted up to an instant before the next current make. The exact cut-off is determined by the length of the intervening conducting segment. Often the condensers across the primary circuit contactors are effective alone to bring about the desired condition and this shunting resistor may be dispensed with.

The commutator is drawn substantially to scale. Each section is diametrically symmetrical.

The method of operation of the instrument shown in Fig. 3 is as follows: First, the automatic stray voltage neutralizer is adjusted in the manner described with reference to Fig. 2, with switch S₃ thrown to short circuit and switch T thrown to the right. Switch S₃ is then thrown to its alternative position, and voltage divider PD' is adjusted to balance the average stray voltage as determined on galvanometer G with the commutator stationary. Switch Y' is then closed and switch 2I opened.

With the commutator structure rotating, potential divider PD is adjusted until the galvanometer registers zero current in the secondary circuit. The setting of the potential divider PD is then a measure of the voltage induced in the secondary earth circuit. Switch T is then thrown to the left and a similar measurement is made of the voltage drop across series resistance R. Designating the portion of the potential divider PD across which the secondary circuit is connected for the voltage observation by R_e and the corresponding multiplier setting M_e, and the values of these quantities for the current observation by R_c and M_c, respectively, the mutual resistance R₁₂ for the two circuits may be calculated from the equation $$R_{12} = \frac{M_e \times R_e}{M_c \times R_c} R$$

Figure 4:
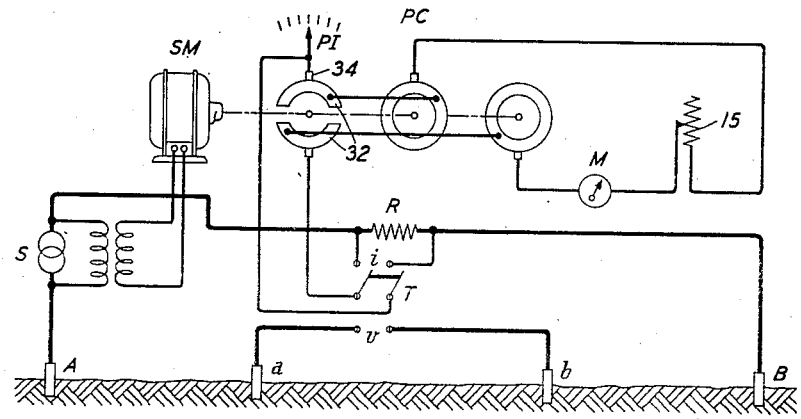
Figs. 4 and 5 represent schematically circuits adapted to measure the alternating current mutual impedance of earth-return circuits.

In Fig. 4 is shown an instrument adapted to measure the alternating-current coupling between two earth-return circuits by an indicating meter method. The primary circuit includes series resistance R and a low frequency alternating-current generator S. A synchronous motor SM, energized from source S, is driven in synchronism with the current alternations in the primary circuit. The potential commutator PC driven from the synchronous motor SM is arranged to rectify either the voltage appearing across series resistor R or the voltage induced in the secondary circuit depending upon the position of double-pole double-throw switch T. The rectified voltage in either case is conducted from the slip rings associated with the commutator PC through series resistance I5 and an indicating meter M.

In the operation of the instrument, switch T is thrown to position i and the brush rigging 34 of the potential commutator PC is varied in position until the deflection on meter M is maximum. Series resistance I5 is then adjusted for a sizable deflection on the meter. The product of the maximum deflection and the series resistance I5 plus meter resistance is the average voltage in the meter circuit. The brush rigging is equipped with a pointer which moves over a dial PI marked in electrical degrees. The angular position of the brushes for the maximum deflection is noted.

A similar observation is then made of the voltage induced in the secondary circuit with switch T in position v and the brush rigging adjusted again for maximum indication of the meter. The angular position indicated on PI is noted.

The mutual impedance is the ratio of the secondary voltage to the primary current or, more directly, the ratio of the two maximum deflections with constant series resistance. The phase angle between primary circuit current and secondary induced voltage is the difference between the two angles observed at the maximum deflection. Alternatively, series resistance R may be replaced by an air-cored transformer.

Where it is undesirable to measure directly the ground electrode or other secondary circuit resistance, the method described with reference to Fig. 1 may be employed.

Figure 5:
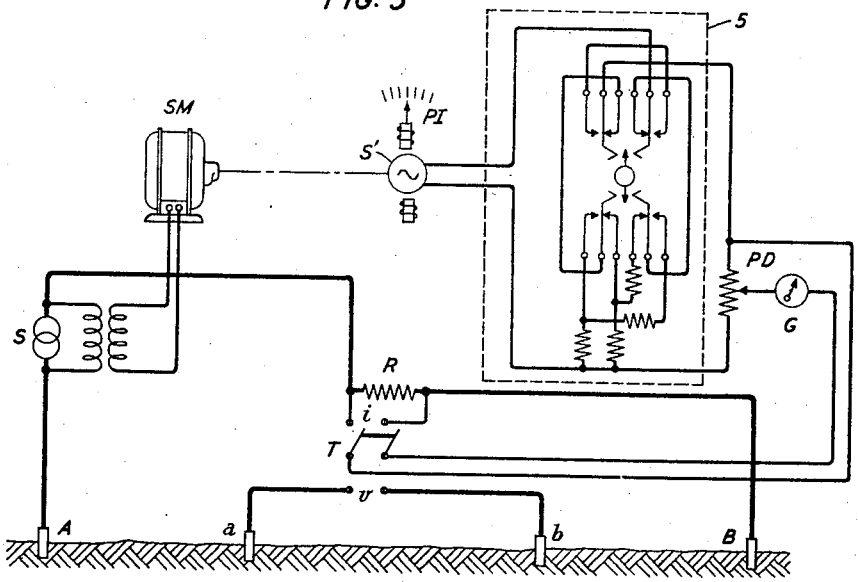

In Fig. 5 is shown an instrument that is adapted to measuring the alternating current mutual impedance of two ground-return circuits by the null-balance method. In this instrument synchronous motor SM drives an alternating-current generator S' which is connected through a voltage multiplier 5 to a potential divider PD. The field structure of the generator S' is adjustable and is varied in position until the deflection of the galvanometer G is a minimum, after which the potential divider PD is varied until a null-balance is observed. The reading of the multiplier, potential divider and the angular position of the field structure as indicated on the scale PI, are recorded. A similar measurement is made of the voltage induced in the secondary circuit by manipulation of the voltage multiplier, potential divider PD and the position of the field structure.

The mutual impedance is the ratio of the secondary voltage to the primary current or the ratio of the two adjustments of the potential divider PD, the total multiplied by the shunt resistance R. The phase angle is the difference between the two angles observed at the null-balances.

What is claimed is:

1. In an earth-return circuit carrying intermittently reversed current, a source of voltage connected in opposition to the stray unidirectional earth potential, and means responsive to said earth potential alone and operative periodically to adjust said opposing voltage to neutralization.

2. In combination, an earth-return circuit carrying intermittent current pulses, means for introducing into said circuit a voltage in opposition to the stray earth potential in said earth-return, and means responsive to said earth potential alone during intervals between said current pulses for adjusting said opposing voltage to the point of neutralization.

3. A combination for geophysical measurements comprising primary and secondary earth-return circuits, a direct current source periodically, reversibly connected in said primary circuit, means in said secondary circuit for rectifying the voltage induced therein, measuring means responsive to the rectified voltage, means for neutralizing the effect of stray earth potentials on said measuring means comprising means for obtaining intermittently a sample of said stray potentials during an interval when no current flows in said primary circuit, and means introducing into said secondary circuit a neutralizing effect under the control of said stray potential sampling means.

4. A combination in accordance with the claim next preceding in which said means for neutralizing the effect of stray earth potentials comprises a space discharge device with input and output circuits therefor, a contactor intermittently connecting said input circuit across said secondary circuit, means for holding the stray potential thus obtained as a control voltage for said discharge device, means for obtaining from said output circuit a uni-directional voltage proportional to said control voltage, and means for applying said uni-directional voltage to said secondary circuit in opposition to said stray earth potential.

5. An earth-resistivity measuring system comprising a primary earth-return circuit carrying periodically reversed current, a secondary earth-return circuit in close proximity to said primary circuit, means in said secondary circuit for obtaining a measure of the ratio of the voltage induced in said secondary circuit to the current in said primary circuit, and means coupling said primary and secondary circuits for counteracting the distributed mutual inductance between said circuits.

6. An earth-resistivity measuring system comprising primary and secondary earth-return circuits, means for passing a periodically reversed direct current through said primary circuit, measuring means responsive to the voltage induced in said secondary circuit, and means for reducing the inductive effect of primary circuit transients on said secondary circuit comprising a mutual inductor coupling said primary and secondary circuits.

7. An earth-resistivity measuring system comprising a primary earth-return circuit, a secondary earth-return circuit, a direct current source and a current reversing commutator in said primary circuit, a rectifying commutator in said secondary circuit, the commutator factor of said rectifying commutator being less than that of said current reversing commutator, and a meter circuit, responsive to the uni-directional current from said source, comprising an auxiliary contactor which completes said meter circuit only during the period when said secondary circuit is completed through said rectifying commutator.

8. An earth-resistivity measuring system comprising a primary earth-return circuit, a secondary earth-return circuit, a direct current source and a current reversing commutator in said primary circuit, a rectifying commutator in said secondary circuit, the commutator factor of said rectifying commutator being less than that of said current reversing commutator, a meter circuit, means for periodically applying to said meter circuit a voltage derived from, and varying in accordance with the amplitude of, the uni-directional current from said source, a second meter circuit and means for simultaneously applying to said second meter circuit the output of said rectifying commutator.

9. An earth-resistivity measuring system comprising primary and secondary earth-return circuits, means for passing a periodically reversed direct current through said primary circuit, a first meter circuit and means for applying periodically thereto, and for periods lying within the pulses of primary circuit current, a uni-directional voltage proportional to the current in said primary circuit, a second meter circuit and means for simultaneously, periodically applying thereto a uni-directional voltage proportional to the voltage induced in said secondary circuit.

10. A combination in accordance with the claim next preceding in which said voltages applied to said meter circuits have the same pulse length.

GEORGE WASCHECK.